(12) United States Patent
Pal

(10) Patent No.: US 12,129,036 B2
(45) Date of Patent: Oct. 29, 2024

(54) COMPONENT COOLING AND COOLING AIR FLOW GENERATION FROM REMOTE HEAT EXCHANGER

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 348 days.

(21) Appl. No.: 17/648,351

(22) Filed: Jan. 19, 2022

(65) Prior Publication Data

US 2023/0227166 A1 Jul. 20, 2023

(51) Int. Cl.
*B64D 13/06* (2006.01)
*B64D 37/32* (2006.01)

(52) U.S. Cl.
CPC ............ *B64D 13/06* (2013.01); *B64D 37/32* (2013.01); *B64D 2013/0614* (2013.01); *B64D 2013/0618* (2013.01); *B64D 2013/064* (2013.01)

(58) Field of Classification Search
CPC .................... B64D 13/06; B64D 37/32; B64D 2013/0614; B64D 2013/0618; B64D 2013/064
See application file for complete search history.

(56) References Cited

U.S. PATENT DOCUMENTS

| | | | |
|---|---|---|---|
| 7,938,214 B2 | 5/2011 | Telakowski | |
| 9,457,908 B2 | 10/2016 | Surawski | |
| 9,470,218 B2 | 10/2016 | Eowsakul | |
| 10,807,722 B2 | 10/2020 | Himmelmann | |
| 10,931,170 B2 | 2/2021 | Parlante | |
| 11,059,593 B2* | 7/2021 | Fagundes | B64D 13/08 |
| 2004/0261428 A1 | 12/2004 | Murry et al. | |
| 2016/0050791 A1* | 2/2016 | Pal | H05K 7/20281 |
| | | | 165/104.31 |
| 2018/0169669 A1 | 6/2018 | Himmelmann | |
| 2020/0412205 A1 | 12/2020 | Pal et al. | |

OTHER PUBLICATIONS

Extended European Search Report for EP Application No. 23151360.7, Dated Jun. 6, 2023, pp. 8.

* cited by examiner

*Primary Examiner* — Gordon A Jones
(74) *Attorney, Agent, or Firm* — Kinney & Lange, P. A.

(57) ABSTRACT

A system for cooling a motor operating within an aircraft system includes an enclosure receiving ram air from a first ram air duct and discharging ram air to a second ram air duct to form a cooling path. The second ram air duct is discrete and independent from the second ram air duct. The system can discharge ram air between a heat exchanger and a fan within the second ram air duct that define a reduced or negative pressure region within the second ram air duct.

20 Claims, 2 Drawing Sheets

COMPONENT COOLING AND COOLING AIR FLOW GENERATION FROM REMOTE HEAT EXCHANGER

BACKGROUND

The present disclosure relates to cooling of aircraft components. More specifically, the present disclosure relates to cooling electric motors utilizing air captured via a ram air duct of the aircraft.

Electric motors are used to drive compressors for pressurizing air, which is used in one or more aircraft systems. One example includes cabin air compressors that are used to compress air to be delivered to an air cycle machine. Air cycle machines are used in environmental control systems to condition air for delivery to the aircraft cabin. Cabin air compressors include an electric motor that is connected to a compressor via a shaft to drive the compressor. Another example includes motor driven compressors that are used to compress air to be delivered to a nitrogen generation system. Nitrogen generation systems are used to produce nitrogen enriched air for delivery to a fuel tank to establish an inert atmosphere within the fuel tank.

Electric motors generate significant heat and need to be cooled. Typically, there are two methods used to air cool electric motors on an aircraft. Above a threshold altitude, electric motors are cooled using ram air. Aircraft are equipped with one or more ram air ducts that capture air external to the aircraft at a ram air inlet and discharge air from the aircraft at a ram air outlet. Cooling systems route ram air to the electric motors. Below the threshold altitude, cabin air is compressed, cooled by a heat exchanger, and routed to the electric motor. Multi-source cooling schemes require additional ducts, pipes, and/or conduits to route air from multiple sources to the electric motor. Additionally, multi-source cooling schemes may also require additional components (e.g., a heat exchanger) to process the cooling air and/or valves (e.g., a check valve, a control valve, and/or a isolation valve) to switch cooling sources at the threshold altitude.

SUMMARY

A system in accordance with an exemplary embodiment of this disclosure can include an enclosure, a first ram air duct, and a second ram air duct, which is discrete and independent from the first ram air duct. A cooling flow path extends from the first ram air duct to the enclosure and from the enclosure to the second ram air duct. The second ram air duct can include a heat exchanger and a fan disposed within the second ram air duct. The cooling flow path can intersect the second ram air duct at a location between the heat exchanger and the fan.

DETAILED DESCRIPTION

As disclosed herein, a system for cooling a component (e.g., an electric motor) operating within an aircraft system includes a first cooling duct extending from a first ram air duct to an enclosure and a second cooling duct extending from the enclosure to a second ram air duct discrete from the first ram air duct. Housed within the enclosure is a component of the system. For instance, the component can be a rotary machine of the aircraft system. In other embodiments, the component can be an electric motor driving one or more compressors of the aircraft system (e.g., a nitrogen generation system). The second cooling duct (i.e., discharge cooling duct) can extend from the enclosure to a reduced pressure or negative pressure region of the second ram air duct. For instance, the second cooling duct can intersect the second ram air duct at a location between an obstruction and an outlet of the second ram air duct. In other embodiments, the second cooling duct intersects the second ram air duct at a location between a component (e.g., a heat exchanger) and a fan operating within the second ram air duct. In some embodiments, a controller applies power to the fan to operate the fan when the aircraft is below an altitude threshold or when the controller determines the aircraft is on the ground. Additionally, the controller can remove power from the fan, allowing it to freewheel, when the controller determines the aircraft is above the altitude threshold or when the controller determines that the aircraft is not on the ground.

Aircraft component cooling systems in accordance with embodiments of this disclosure eliminate additional ducts, conduits, piping and associated components (e.g., valves filters) necessary for multi-source cooling systems. In each of the following embodiments, ram air cools the aircraft system component (e.g., electric motor) for all operating and flight conditions of the aircraft. By discharging component cooling flow into a reduced pressure or negative pressure region of a second ram air duct discrete from the ram air intake duct, component cooling flow maintains sufficient temperature and flow rate, even at lower altitudes and during ground operation of the aircraft when typical ram air flows are insufficient.

Figure 1:
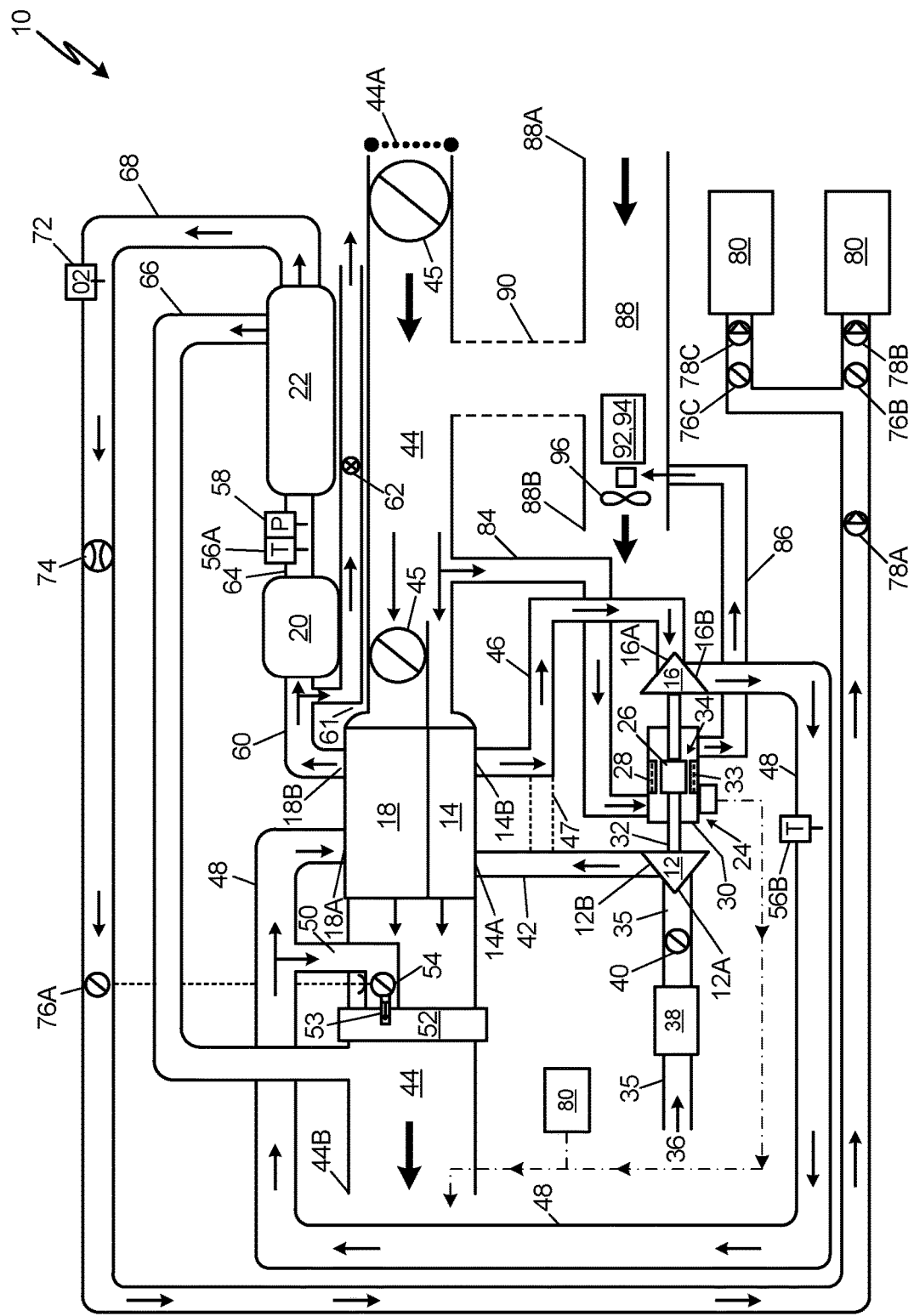
FIG. 1 is a schematic of a nitrogen generation system (NGS) incorporating a motor cooled by a single source of ram air.

FIG. 1 is a schematic of nitrogen generation system (NGS) 10 of an aircraft. NGS 10 includes first stage compressor 12, interstage heat exchanger 14, second stage compressor 16, primary heat exchanger 18, ozone converter 20, and air separation module 22. For driving first stage compressor 12 and second stage compressor 16, NGS 10 includes motor 24. As depicted, motor 12 is a three-phase permanent magnet motor comprising rotor 26 and stator 28 housed within enclosure 30. Rotor 26 mounts to shaft 32, which is supported by enclosure 30 via bearings. Shaft 32 rotationally connects rotor 26 to first stage compressor 12 and second stage compressor 16. Stator 28 includes cooling channels 33 distributed about the circumference of stator 28 as depicted by dashed lines in FIG. 1. Cooling air delivered to enclosure 30 flows through enclosure 30 via cooling channels 33 as well as rotor-stator gap 34 defined between a radial outer periphery of rotor 26 and a radially inner periphery of stator 28. Ozone converter 20 contains a catalytic material operable to convert ozone to dioxygen and/or oxygen gas. Air separation module 22 contains a filter element that permits a higher percentage of nitrogen gas to pass through than oxygen gas. For example, the filter element may consist of an assembly of small diameter tubes that permit more nitrogen gas to pass than oxygen gas. Using the filter element, air separation module 22 outputs nitrogen-enriched gas and an oxygen-enriched gas stream produced from the cabin air. NGS 10 may include various other sensors measuring pressure and/or temperature at various stages of the process as well as valves, mufflers, among other components that aid the operation of NGS 10 that will be discussed as necessary in the following description.

A rotational speed of motor 24 and, therefore, a rotational speed of first stage compressor 12 and second stage compressor 16 is regulated by a motor controller. For instance, motor 24 can receive a constant supply voltage from a power distribution system of the aircraft via three-phase inverter. The motor controller provides commutation signals to the three-phase inverter, which selectively supplies the supply voltage to one or more phases of motor 24 in sequence to drive rotation of motor 24 at a desired speed.

Supply line 35 extends from cabin air source 36 to inlet 12A of first stage compressor 12 to provide cabin air to NGS 10. Along supply line 35, NGS 10 can include muffler 38 for attenuating sound of NGS 10 and valve 40 for controlling cabin air flow into NGS 10 and/or for isolating NGS 10 from cabin air source 36.

Rotationally driven by motor 24, first stage compressor 12 increases cabin air pressure at outlet 12B. Interstage line 42 extends from outlet 12B of first stage compressor 12 to inlet 14A of interstage heat exchanger 14. Ram air duct 44 extends from ram air inlet 44A to ram air outlet 44B. Located at an external surface of the aircraft, ram air inlet 44A captures air external to the aircraft. Ram air duct 44 can be equipped with one or more valves 45 (or doors) operable to vary the open area at ram air inlet 44A and/or at one or more heat exchangers (i.e., interstage heat exchanger 14 and/or primary heat exchanger 18). Ram air flows through ram air duct 44 and interstage heat exchanger 14 to cool cabin air heated through pressurization by first stage compressor 12. Downstream from interstage heat exchanger 14, ram air discharges from the aircraft through ram air outlet 44B located at the exterior surface of the aircraft. Once cooled, cabin air exits interstage heat exchanger 14 at outlet 14B. Interstage line 46 extends from outlet 14B of interstage heat exchanger 14 to inlet 16A of second stage compressor 16. Also driven by motor 24, second stage compressor further increases a static pressure of cabin air delivered to outlet 16B. In some embodiments, NGS 10 does not include interstage heat exchanger 14 and, instead, interstage line 42 and interstage line 46 join to allow outlet 12 B of first stage compressor 12 to communicate directly with inlet 16A of second stage compressor 16 as indicated by dashed lines 47.

Subsequently, pressure delivery line 48 extends from outlet 16B of second stage compressor 16 to inlet 18A of primary heat exchanger 18. The flow rate of cabin air delivered to primary heat exchanger 18 can be regulated by returning excess cabin air to ram air duct 44 via bypass line 50. Bypass line 50 extends from a location along pressure delivery line 48 upstream from primary heat exchanger 18 into ram air duct 44. In some instances, bypass line 50 discharges upstream of muffler 52 to attenuate sound emanating from NGS 10. Additionally, extraction of excess cabin air can be aided by ejector 53 at a discharge end of bypass line 50. Positioned along bypass line 50, control valve 54 varies a flow rate of cabin air through bypass line 50 and thereby a flow rate of cabin air delivered to primary heat exchanger 18. Control valve 54 varies the flow rate of cabin air through bypass line 50 based on at least one temperature T of cabin air within NGS 10 and, in some instances, at least one pressure P of cabin air within NGS 10. For instance, temperature sensor 56A outputs a signal indicative of cabin air temperature T between ozone converter 20 and air separation module 22 (i.e., downstream from ozone converter 20 and upstream from air separation module 22). Likewise, pressure sensor 58 outputs a signal indicative of cabin air pressure P between ozone converter 20 and air separation module 22. However, one or more temperatures T and pressures P of cabin air can be utilized for regulating the flow within bypass line 50 or other aspects of NGS 10. For instance, temperature sensor 56B outputs a signal indicative of the cabin air temperature T within pressure delivery line 48.

Within heat exchanger 18, ram air delivered to heat exchanger 18 via ram air duct 44 cools cabin air. Extending from outlet 18B of primary heat exchanger 18, supply line 60 delivers pressurized and conditioned cabin air to an inlet of ozone converter 20. Within ozone converter 20, ozone molecules contained within the cabin air stream are converted into oxygen dioxide and/or oxygen gas.

Optionally, some of the cabin air can be diverted to other aircraft systems using branch line 61 intersecting supply line 60 at a location between primary heat exchanger 18 and ozone converter 20. Flow through branch line 61 can be regulated or blocked using valve 62 as NGS 10 or the ancillary aircraft system may require. For example, some cabin air can be diverted to cool or heat probes and/or sensors located exterior to the aircraft such as total air temperature (TAT) probes, pitot probes, pitot-static probes, angle of attack vanes, and/or multi-functional probes (MFPs). While only one branch line 61 is depicted by FIG. 1, some embodiments may include multiple branch lines 61 routing cabin air to one or more different regions of the aircraft for utilization in one or more ancillary aircraft systems.

Output from ozone converter 20, cabin air continues along supply line 64 to air separation module 22. Within air separation module 22, cabin air separates into nitrogen-enriched and oxygen-enriched air flows. Oxygen-enriched air returns to ram air duct 44 via permeate air line 66. Permeate air line 66 intersects ram air duct 44 at any location between ram air outlet 44B and outlets of interstage heat exchanger 14 and primary heat exchanger 18. As shown, permeate air line 66 intersects ram air duct 44 downstream from muffler 52. Nitrogen-enriched air flows along inert gas line 68 that extends from air separation module 22 to one or more fuel tanks 80. Inert gas line 68 can include various other components for controlling, regulating, or otherwise managing the nitrogen-enriched air flow such as oxygen sensor 72, venturi 74, valves 76A, 76B, and 76C, and/or check valves 78A, 78B, and 78C.

Accordingly, during operation of the aircraft, NGS 10 converts cabin air into nitrogen-enriched air and oxygen-enriched air and delivers nitrogen-enriched air to one or more fuel tanks 80. At the beginning of a flight, less nitrogen-enriched air is required since fuel tanks 80 contain more fuel. As the fuel tanks empty, additional nitrogen-enriched air is needed to fill the empty fuel tank volume. To satisfy a need for additional nitrogen-enriched air, controller 82 commands motor 24 to operate at a higher rotational speed, increasing the pressure and flow rate of cabin air into NGS 10. As the load on motor 24 increases, a temperature of the rotor and stator increase.

During all phases of operation, ram air redirected from ram air duct 44 provides cooling to motor 24. Cooling supply line 84 extends from ram air duct 44 and enclosure 30 of motor 24. The inlet of cooling supply line 84 is between ram air inlet 44A and inlets of interstage heat exchanger 14 and primary heat exchanger 18. Cooling supply line 84 penetrates enclosure 30 at a location adjacent to rotor 26 and stator 28. To facilitate flow of ram air through cooling channels 33 and rotor-stator gap 35 of motor 24, cooling discharge line 86 intersects enclosure 30 at an opposite end relative to cooling supply line 84. Cooling discharge line 86 extends from enclosure 30 to ram air duct 88, which is discrete and independent from ram air duct 44 utilized for cooling components of NGS 10. Ram air duct 88 extends from ram air inlet 88A to ram air outlet 88B. In some embodiments, ram air duct 88 Is not independent from ram air duct 44 of NGS 10 and can communicate with ram air duct 44 of NGS 10 via cross-over passage 90 as represented by dashed lines in FIG. 1.

Ram air duct 88 supplies ram air to one or more aircraft systems separate from NGS 10. For instance, ram air duct 88 may supply ram air to an environmental control system used to condition and supply cabin air to pressurized regions of the aircraft. However, in other embodiments, ram air duct 88 can supply other aircraft systems with ram air.

In some embodiments, cooling discharge line 86 intersects ram air duct 88 at a location of locally reduced pressure or negative gauge pressure relative to a pressure of ram air at ram air inlet 88A. The locally reduced or negative gauge pressure can be induced by the flow of ram air past or through an obstruction within ram air duct 88. In other embodiments, the locally reduced or negative gauge pressure can be induced by the flow of ram air past or through a component 92 wholly or partially disposed within ram air duct 88.

For example, an environmental control system (ECS) of the aircraft can include heat exchanger 94 as component 92. Heat exchanger 94 of ECS utilizes ram air to regulate a temperature of air pressurized by electrically driven compressors for subsequent production of cabin air and pressurization of the aircraft. In other embodiments, ram air can be used to regulate the temperature of bleed air extracted from the engines prior during the production of cabin air.

To facilitate flow of ram air through ram air duct 88 for a wide range of aircraft altitudes and operating conditions, ram air duct 88 can include fan 96 positioned between heat exchanger 94 (or component 92) and ram air outlet 88B. In the case of the environment control system, fan 96 is operated below a threshold altitude to maintain sufficient air flow through ram air duct 88 at low altitude and while the aircraft is on the ground, including when the aircraft is stationary. In some embodiments, the threshold altitude can be approximately 1500 feet (457.2 meters). In other embodiments, the threshold altitude can be greater than or less than 1500 feet (457.2 meters). Accordingly, operation of fan 96 below the threshold altitude and/or while the aircraft is on the ground ensures sufficient airflow through ram air duct 88. During operation of the aircraft, the region of ram air duct 88 between heat exchanger 94 (or component 92) and fan 96 has a reduced or negative gauge pressure relative to a ram air pressure at ram air inlet 88A.

In this instance, cooling discharge line 86 may intersect ram air duct 88 within this low ram air pressure region (i.e., between component 92 or heat exchanger 94 and fan 96). The persistent low pressure within this region of ram air duct 88 is also a reduced or negative ram air pressure relative to a pressure of ram air within ram air duct 44 of NGS 10. The pressure differential between first ram air duct 44 and second ram air duct 88 at the location between fan 96 and component 92 (or heat exchanger 94) drives cooling flow through enclosure 30 via stator cooling channels 33 and rotor-stator gap 34. Accordingly, flow through cooling supply line 84, enclosure 30 of motor 24, and cooling discharge line 86 is sufficient to cool motor 24 at all operating and flight conditions of the aircraft.

For example, Table 1 outlines expected operational pressure and Table 2 describes corresponding cooling flows for exemplary hot day operation (e.g., ground, climb, and cruise) and standard day operation (e.g., cruise). Hot day operation corresponds to an ambient ground temperature of 55° C. and an ambient ground pressure of 1 atmosphere (101.325 kPa). Standard day operation corresponds to an ambient ground temperature of 15° C. and an ambient ground pressure of 1 atmosphere (101.325 kPa). As altitude increases, ambient temperature decreases until about 36,000 ft (10972.8 meters). The ambient temperature remains constant above 36,000 ft (10972.8 meters) at least up to the maximum cruising altitude of most aircraft. Ambient pressure also decreases as altitude increases.

As shown by exemplary operating conditions in Table 1, the differential pressure driving cooling flow through enclosure 30 can exceed 1.50 kPa for hot day ground operations. Provided in part by operation of fan 96, this differential pressure can produce approximately 2.0 kg/min of ram air flow through enclosure 30 during hot day ground operation from a ram air cooling source. The ram air temperature at the inlet of enclosure 30 can be approximately 39.4° C. for hot day ground operation. After climbing above the threshold altitude and during cruise operation, fan 96 spins freely while unpowered. During these operating conditions, the available differential pressure for motor cooling increases with increasing airspeed of the aircraft. Increased differential pressure conditions between ram air duct 44 and ram air duct 88 drive additional cooling flow while increased altitude contributes to decreased cooling flow temperatures as shown in Table 2 for climb and cruise hot day operation. Similarly, the differential pressure during of standard day cruise operation can exceed 800 Pa, driving approximately 2.4 kg/min of cooling flow through enclosure 30.

TABLE 1

Exemplary Pressure Conditions of Cooling Flow

| Operating Condition | Absolute pressure within ram air duct 44 at cooling duct 84 [kPa] | Absolute pressure within ram air duct 88 between fan 96 and component 92/heat exchanger 94 [kPa] | Available differential pressure for motor cooling [kPa] | Available differential pressure for motor cooling [mmHg] |
|---|---|---|---|---|
| Hot Day, Sea Level Ground Operation | 101.284 | 99.698 | 1.586 | 11.9 |
| Hot Day, Climb @ 10,000 ft | 75.498 | 73.498 | 1.999 | 15.0 |
| Hot Day, Cruise @ 40,000 ft | 22.891 | 20.822 | 2.068 | 15.5 |
| Standard Day, Cruise @ 40,000 ft | 23.580 | 22.684 | 0.896 | 6.7 |

TABLE 2

Exemplary Cooling Flow Through Enclosure

| Operating Condition | Estimated cooling flow through enclosure 30 [kg/min] | Estimated temperature of cooling flow at enclosure 30 inlet [° C.] |
|---|---|---|
| Hot Day, Sea Level Ground Operation | 2.0 | 39.4 |
| Hot Day, Climb @ 10,000 ft | 2.7 | 17.8 |
| Hot Day, Cruise @ 40,000 ft | 2.9 | −9.3 |
| Standard Day, Cruise @ 40,000 ft | 2.4 | −25.1 |

Operation of fan 96 can be regulated by controller 98 that includes at least one processor 100 and memory 102. Examples of processor 100 can include any one or more of a microprocessor, a controller, a digital signal processor (DSP), an application specific integrated circuit (ASIC), a field-programmable gate array (FPGA), or other equivalent discrete or integrated logic circuitry. Memory 102 can be configured to store information pertaining to the operation of fan 96 such as the threshold altitude. Additionally, memory 102 can store instructions (i.e., software, algorithm, or program) that, when executed by processor 100, cause controller 98 to operate the system. Memory 102, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Memory 102 can include volatile and non-volatile computer-readable memories. Examples of volatile memories can include random access memories (RAM), dynamic random-access memories (DRAM), static random-access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories.

In operation, controller 98 may receive an indication of the altitude of the aircraft. For instance, the altitude indication can be a pressure altitude sensed by one or more pressure transducers. Pressure transducers can be mounted flush with an exterior surface of the aircraft to sense static pressure of the aircraft such as, for example, in a static pressure probe. In other instances, one or more pressure transducers may be mounted within or fluidly communicate with ports of a pitot-tube, a pitot-static tube, and/or multi-function probe attached to the exterior of the aircraft. In each instance, controller 98 receives and analog signal (e.g., a voltage or current signal) or a digital signal (e.g., predetermined voltage or current signal) that is indicative of the aircraft altitude. In another example, the altitude indication may be provided by a radio altimeter or as an output of aircraft avionics.

In some embodiments, controller 98 may receive an indication that the aircraft is on the ground in addition to or instead of an altitude indication. For example, a signal from a weight-on-wheels (WOW) sensor may provide an analog or digital signal to the controller 98. In a first state, the signal is indicative of the aircraft in contact with the ground. In a second state, the signal indicates that the aircraft is in flight or not in contact with the ground.

When the altitude of the aircraft is below a threshold altitude and/or the weight-on-wheel sensor indicates the aircraft is on the ground, controller 98 electrically connects fan 96 to the aircraft power distribution system, causing fan 96 to operate. Alternatively, when the attitude of the aircraft is above the threshold altitude and/or the weight-on-wheel sensor indicates the aircraft is not contacting the ground, controller 98 electrically disconnects fan 96 from the aircraft power distribution system, causing fan 96 to stop operating and permitting fan to freewheel as propelled by ram air flowing through ram air duct 88.

Figure 2:
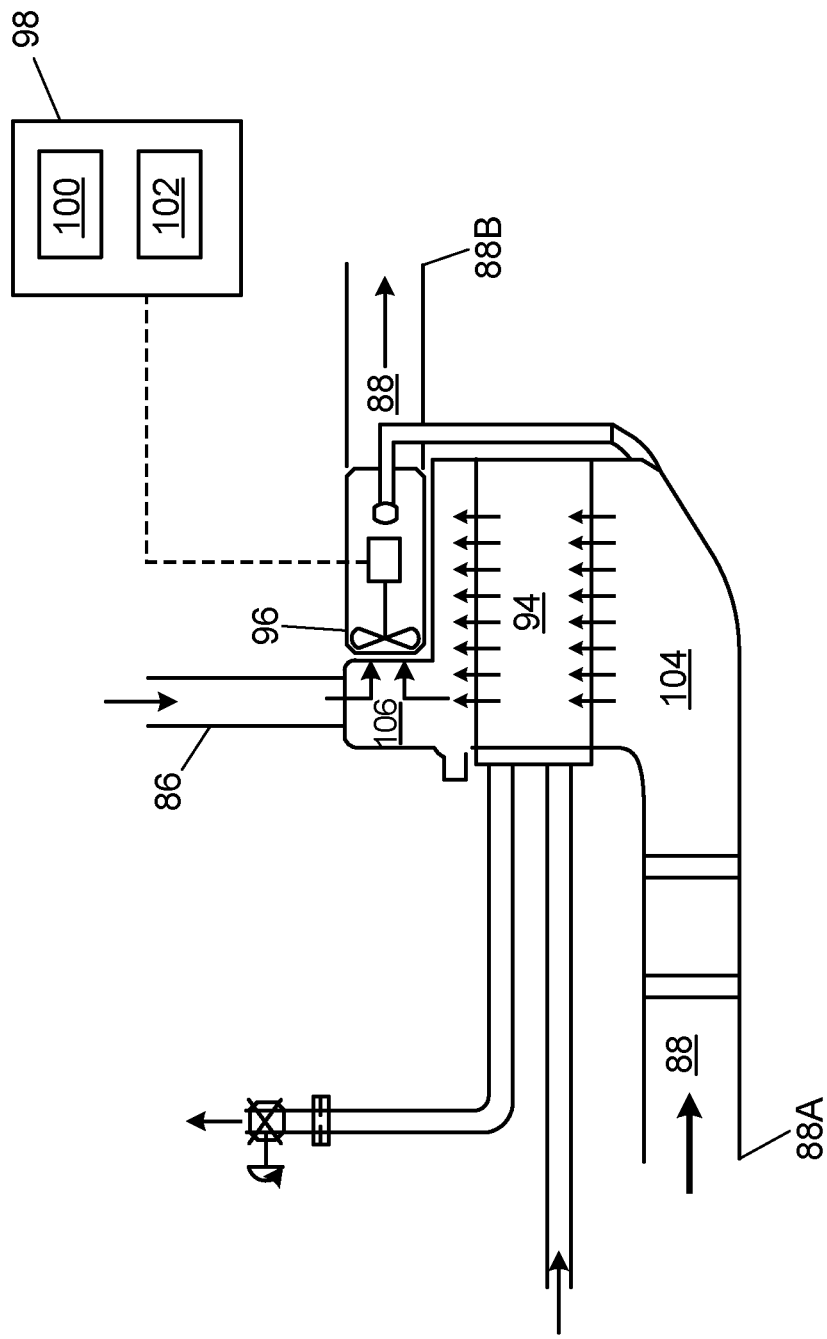
FIG. 2 is a schematic of an exemplary discharge location for the cooling system depicted by FIG. 1.

FIG. 2 depicts an exemplary embodiment that integrates cooling discharge duct 86 with ram air duct 88 and components of an aircraft environmental control system. Ram air enters duct 88 at inlet 88A and flows left-to-right as depicted in FIG. 2 towards heat exchanger 94. A portion of ram air duct 88 forms inlet manifold 104 characterized by increasing flow area cross-section towards heat exchanger 94 that facilitates even distribution of ram air across an inlet side of heat exchanger 94. Similarly, ram air duct 88 can form outlet manifold 106 at an outlet side of heat exchanger 94 characterized by a decreasing cross-sectional flow area in a direction of flow away from heat exchanger 94. Fan 96 is downstream from heat exchanger 94 at a location between outlet manifold 106 and ram air outlet 88B. In this embodiment, cooling discharge line 86 can intersect outlet manifold 106 in the region between heat exchanger 94 and an inlet of fan 96.

Discussion of Possible Embodiments

The following are non-exclusive descriptions of possible embodiments of the present invention.

A system for cooling a component of an aircraft according to an exemplary embodiment of this disclosure includes, among other possible things, an enclosure housing the component, a first ram air duct, a second ram air duct, and a cooling flow path. The first ram air duct extends from a first inlet to a first outlet, and the second ram air duct extends from a second ram air inlet to a second ram air outlet. The second ram air duct is discrete and independent from the first ram air duct. The cooling flow path includes a first cooling duct communicating with the first ram air duct and the enclosure and a second cooling duct communicating with the enclosure and the second ram air duct.

The system of the preceding paragraph can optionally include, additionally and/or alternatively, any one or more of the following features, configurations and/or additional components.

A further embodiment of the foregoing system can include a fan disposed within the second ram air duct that, in operation, propels air within the second ram air duct from a fan inlet to a fan outlet.

A further embodiment of any of the foregoing systems, wherein the second cooling duct can communicate with the second ram air duct upstream from the fan inlet.

A further embodiment of any of the foregoing systems can include a heat exchanger disposed within the second ram air duct.

A further embodiment of any of the foregoing systems wherein the second cooling duct can communicate with the second ram air duct between the fan inlet and the component.

A further embodiment of any of the foregoing systems can include a controller comprising a processor and computer-readable memory.

A further embodiment of any of the foregoing systems, wherein the computer-readable memory can contain instructions that, when executed by the processor, cause the system to connect electric power to the fan and thereby operate the fan upon receiving an indication that the aircraft is below a minimum altitude or an indication that the aircraft is on the ground.

A further embodiment of any of the foregoing systems, wherein the computer-readable memory can contain instructions that, when executed by the processor, cause the system to disconnect electric power to the fan and thereby allowing the fan to freewheel upon receiving an indication that the aircraft is above the minimum altitude or an indication that the aircraft is not on the ground.

A further embodiment of any of the foregoing systems, wherein the second ram air duct can supply ram air to an environmental control system of the aircraft.

A further embodiment of any of the foregoing systems, wherein the second ram air duct can form an exhaust manifold between the heat exchanger and the fan inlet.

A further embodiment of any of the foregoing systems can include a motor housed within the enclosure.

A further embodiment of any of the foregoing systems can include a first compressor rotationally driven by the motor via a shaft.

A further embodiment of any of the foregoing systems can include a compressor inlet duct fluidly connecting the first compressor to a cabin air source of the aircraft.

A further embodiment of any of the foregoing systems can include a second compressor rotationally driven by the motor via the shaft.

A further embodiment of any of the foregoing systems can include an interstage line fluidly connecting an outlet of the first compressor to the inlet of the second compressor.

A further embodiment of any of the foregoing systems can include an interstage heat exchanger disposed along the interstage line.

A further embodiment of any of the foregoing systems, wherein the interstage heat exchanger can be disposed within the first ram air duct in a heat exchange relationship with the ram air.

A further embodiment of any of the foregoing systems can include a primary heat exchanger disposed within the first ram air duct.

A further embodiment of any of the foregoing systems can include a pressure delivery line extending from an outlet of the second compressor to the primary heat exchanger.

A further embodiment of any of the foregoing systems, wherein the primary heat exchanger can place cabin air in a heat exchange relationship with air within the first ram air duct.

A further embodiment of any of the foregoing systems can include an air separation module.

A further embodiment of any of the foregoing systems can include a supply line fluidly connecting the primary heat exchanger to the air separation module.

A further embodiment of any of the foregoing systems can include an inert gas line fluidly connecting the air separation module to a fuel tank of the aircraft.

A further embodiment of any of the foregoing systems can include a permeate air line fluidly connecting the air separation module to the ambient air external to the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for cooling a component of an aircraft, the system comprising:
   an enclosure, wherein the enclosure houses the component;
   a first ram air duct extending from a first inlet to a first outlet;
   a second ram air duct extending from a second inlet to a second outlet, wherein the second ram air duct is discrete and independent from the first ram air duct; and
   a cooling flow path extending, in series, through the enclosure comprising:
      a first cooling duct fluidly communicating with the first ram air duct and a first end of the enclosure; and
      a second cooling duct fluidly communicating with a second end of the enclosure and the second ram air duct, wherein the second end is opposite the first end.

2. The system of claim 1, further comprising:
   a fan disposed within the second ram air duct that, in operation, propels air within the second ram air duct from a fan inlet to a fan outlet, wherein the second cooling duct communicates with the second ram air duct upstream from the fan inlet.

3. The system of claim 2, further comprising:
   a heat exchanger disposed within the second ram air duct, wherein the second cooling duct communicates with the second ram air duct between the fan inlet and the component.

4. The system of claim 3, further comprising:
   a controller comprising a processor and computer-readable memory containing instructions that, when executed by the processor, cause the system to:
      connect electric power to the fan and thereby operate the fan upon receiving an indication that the aircraft is below a minimum altitude or an indication that the aircraft is on the ground.

5. The system of claim 4, wherein the computer-readable memory contains instructions, that when executed by the processor, cause the system to:
   disconnect electric power to the fan and thereby allowing the fan to freewheel upon receiving an indication that the aircraft is above the minimum altitude or an indication that the aircraft is not on the ground.

6. The system of claim 3, wherein the second ram air duct supply ram air to an environmental control system of the aircraft.

7. The system of claim 6, wherein the second ram air duct forms an exhaust manifold between the heat exchanger and the fan inlet.

8. The system of claim 7, further comprising:
   a motor housed within the enclosure; and
   a first compressor rotationally driven by the motor via a shaft.

9. The system of claim 8, further comprising:
   a compressor inlet duct fluidly connecting the first compressor to a cabin air source of the aircraft.

10. The system of claim 9, further compressing:
a second compressor rotationally driven by the motor via the shaft; and
an interstage line fluidly connecting an outlet of the first compressor to the inlet of the second compressor.

11. The system of claim 10, further comprising:
an interstage heat exchanger disposed along the interstage line, wherein the interstage heat exchanger is disposed within the first ram air duct in a heat exchange relationship with the ram air.

12. The system of claim 9, further comprising:
a primary heat exchanger disposed within the first ram air duct;
a pressure delivery line extending from an outlet of the second compressor to the primary heat exchanger;
wherein the primary heat exchanger places cabin air in a heat exchange relationship with air within the first ram air duct.

13. The system of claim 12, further comprising:
an air separation module;
a supply line fluidly connecting the primary heat exchanger to the air separation module;
an inert gas line fluidly connecting the air separation module to a fuel tank of the aircraft; and
a permeate air line fluidly connecting the air separation module to the ambient air external to the aircraft.

14. A system for cooling a component of an aircraft, the system comprising:
an enclosure, wherein the enclosure houses the component;
a first ram air duct extending from a first inlet to a first outlet;
a second ram air duct extending from a second inlet to a second outlet, wherein the second ram air duct is discrete and independent from the first ram air duct;
a fan disposed within the second ram air duct that, in operation, propels air within the second ram air duct from a fan inlet to a fan outlet, wherein the second cooling duct communicates with the second ram air duct upstream from the fan inlet;
a heat exchanger disposed within the second ram air duct, wherein the second cooling duct communicates with the second ram air duct between the fan inlet and the heat exchanger;
a controller comprising a processor and computer-readable memory containing instructions that, when executed by the processor, cause the system to:
connect electric power to the fan and thereby operate the fan upon receiving an indication that the aircraft is below a minimum altitude or an indication that the aircraft is on the ground; and
a cooling flow path extending, in series, through the enclosure comprising:
a first cooling duct fluidly communicating with the first ram air duct and a first end of the enclosure; and
a second cooling duct fluidly communicating with a second end of the enclosure and the second ram air duct at a location between the heat exchanger and the fan inlet, wherein the second end is opposite the first end.

15. The system of claim 14, wherein the computer-readable memory contains instructions, that when executed by the processor, cause the system to:
disconnect electric power to the fan and thereby allowing the fan to freewheel upon receiving an indication that the aircraft is above the minimum altitude or an indication that the aircraft is not on the ground.

16. The system of claim 15, wherein the second ram air duct forms an exhaust manifold between the heat exchanger and the fan inlet.

17. The system of claim 16, further comprising:
a motor housed within the enclosure;
a first compressor rotationally driven by the motor via a shaft; and
a second compressor rotationally driven by the motor via the shaft.

18. The system of claim 17, further comprising:
a compressor inlet duct fluidly connecting the first compressor to a cabin air source of the aircraft;
an interstage line fluidly connecting an outlet of the first compressor to the inlet of the second compressor; and
an interstage heat exchanger disposed along the interstage line, wherein the interstage heat exchanger is disposed within the first ram air duct in a heat exchange relationship with the ram air.

19. The system of claim 18, further comprising:
a primary heat exchanger disposed within the first ram air duct;
a pressure delivery line extending from an outlet of the second compressor to the primary heat exchanger;
wherein the primary heat exchanger places cabin air in a heat exchange relationship with air within the first ram air duct.

20. The system of claim 19, further comprising:
an air separation module;
a supply line fluidly connecting the primary heat exchanger to the air separation module;
an inert gas line fluidly connecting the air separation module to a fuel tank of the aircraft; and
a permeate air line fluidly connecting the air separation module to the ambient air external to the aircraft.

* * * * *